United States Patent
Freeman et al.

(10) Patent No.: US 11,412,706 B2
(45) Date of Patent: Aug. 16, 2022

(54) ANIMAL FEED TROUGH

(71) Applicant: Realwood Productions, LLC, Rock Hill, SC (US)

(72) Inventors: Bobby Allen Freeman, Rock Hill, SC (US); Taylor Ashton Freeman, Fort Mill, SC (US); Todd Scott, Fort Mill, SC (US)

(73) Assignee: REALWOOD PRODUCTIONS, LLC, Rock Hill, SC (US)

( * ) Notice: Subject to any disclaimer, the term of this patent is extended or adjusted under 35 U.S.C. 154(b) by 63 days.

(21) Appl. No.: 17/063,755

(22) Filed: Oct. 6, 2020

(65) Prior Publication Data

US 2022/0104455 A1 Apr. 7, 2022

(51) Int. Cl.
*A01K 5/00* (2006.01)
*A01K 5/01* (2006.01)
*A01M 31/00* (2006.01)

(52) U.S. Cl.
CPC ............. *A01K 5/01* (2013.01); *A01M 31/008* (2013.01)

(58) Field of Classification Search
CPC .......... A01K 5/01; A01K 1/10; A01K 5/0225; A01K 5/0114; A01K 39/012; A01K 39/014; A01K 5/0135; A01K 5/0142; A01K 5/0233; A01K 5/0241; A01K 5/0208; A01K 5/025; A01K 5/0258; A01K 5/0266; A01K 5/0275
See application file for complete search history.

(56) References Cited

U.S. PATENT DOCUMENTS

| 1,172,913 | A | * | 2/1916 | Slater | A01K 5/01 |
|---|---|---|---|---|---|
| 4,312,298 | A | * | 1/1982 | Swearingin | A01K 5/00 |
| | | | | | 119/54 |
| 10,314,289 | B1 | * | 6/2019 | Harding | A01K 5/02 |
| 2006/0000417 | A1 | * | 1/2006 | Loewe | A01K 5/00 |
| | | | | | 119/53 |
| 2021/0204509 | A1 | * | 7/2021 | Staples | A01K 5/01 |

* cited by examiner

*Primary Examiner* — Joshua J Michener
*Assistant Examiner* — Henry Hooper Mudd
(74) *Attorney, Agent, or Firm* — Shumaker, Loop & Kendrick, LLP (57) ABSTRACT

An animal feed trough that includes a base having a triangular configuration defined by a central ridge extending along a length of the base, tapering downwardly and outwardly from the central ridge to define a plurality of feed dishes extending along the length of the base. A body having a side wall panel and opposing, spaced-apart end caps defining an interior for storing a supply of grain is adapted for being mounted on and supported by the base and having an open bottom for gravity flow of grain from the body onto the base and into the plurality of feed dishes. An opening is provided in the body for introducing grain into the interior of the body, and a lid panel is provided for covering and closing the opening in the body.

14 Claims, 8 Drawing Sheets

ANIMAL FEED TROUGH

TECHNICAL FIELD AND BACKGROUND OF THE INVENTION

This invention relates to an animal feed trough, in particular, a feed trough intended to dispense corn or some other grain to feral animals such as deer, elk and the like. Animals are fed in this way to bring them into an area where they can be hunted. For example, hunters will set out a feeder to attract deer into a hunting area during winter or to have a deer population present during the hunting season. In many cases this practice is also carried out as part of a means of thinning a deer population down to a level that is manageable within the context of the geographical location and size of the area where the deer population is present. Over population of deer results in an increase in disease, crowding of deer into residential areas and onto roads, streets and freeways where collisions with vehicles have become commonplace.

Some animal feed troughs are wind or battery powered, and have mechanisms that disperse grain onto the ground around the feeder. Other feeders are gravity fed, and rely on the grain to fall into an access opening where it can be eaten by an animal. Known prior art gravity feeders have narrow, tube-like openings that are prone to clogging and jamming, thus preventing proper and adequate distribution of grain to the animals as intended.

Prior art animal feed troughs tend to be fabricated of sheet metal and are either painted a solid color or left as bare metal. These designs present an appearance that is unnatural and may discourage the animals from approaching the feeder. In addition, many such feed troughs are bulky and therefore difficult and expensive to ship.

SUMMARY OF THE INVENTION

It is therefore an object of the present invention to provide an improved animal feed trough wherein grain is fed by gravity into an area where the animal can access and consume the grain.

It is another object of the invention to provide an improved animal feed trough that feeds the grain into wide feed dishes which permits several animals to feed at the same time.

It is another object of the invention to provide an improved animal feed trough that presents a natural, non-threatening appearance to animals that will encourage them to approach the feed trough.

It is another object of the invention to provide an improved animal feed trough that is compact, collapsible into an easily shippable shape and size, and yet has a large grain capacity.

These and other objects and advantages of the invention are achieved by providing an animal feed trough that includes a base having a triangular configuration defined by a central ridge extending along a length of the base, tapering downwardly and outwardly from the central ridge to define a plurality of feed dishes extending along the length of the base. A body is provided having a side wall panel and opposing, spaced-apart end caps defining an interior for storing a supply of grain. The body is adapted for being mounted on and supported by the base and has an open bottom for gravity flow of grain from the body onto the base and into the plurality of feed dishes. An opening is provided in the body for introducing grain into the interior of the body; and a lid panel is provided and adapted for covering and closing the opening in the body.

In accordance with another embodiment of the invention, the side wall panel of the body defines a cylindrical shape, and the end caps are cylindrical and enclose the opposing ends of the side wall.

In accordance with another embodiment of the invention, the side wall is defined by a pair of curved side panels.

In accordance with another embodiment of the invention, the feed dishes include respective feed stops extending laterally across each feed dish to retain the grain in the feed dish and prevent the grain from flowing onto a surrounding ground surface.

In accordance with another embodiment of the invention, the side wall panel, lid panel and the end caps include a veneer cover comprising a wood bark surface configuration.

In accordance with another embodiment of the invention, an animal feed trough is provided, and includes a base having a triangular configuration defined by a central ridge extending along a length of the base, tapering downwardly and outwardly from the central ridge to define a plurality of feed dishes extending along the length of the base. A body having a length and a width is defined by first and second curved side wall panels and opposing, spaced-apart cylindrical end caps define an interior for storing a supply of grain. The body is adapted for being mounted on and supported by the base and has open bottom feed slots for gravity flow of grain from the body onto the base and into the plurality of feed dishes. An opening is provided in a topmost portion of the body for introducing grain into the interior of the body and a lid panel is provided for covering and closing the opening in the body. First and second curved body covers are attached to and cover the first and second curved side wall panels, and a lid cover is provided for attachment to and for covering the lid panel. End cap covers are positioned on and covering the opposing, spaced-apart cylindrical end caps, and hand holds are positioned on the end cap covers and adapted for enabling a user to carry the trough.

In accordance with another embodiment of the invention, the lid panel overlaps the curved body covers to prevent entry of moisture into the interior of the body.

In accordance with another embodiment of the invention, the feed dishes are defined by spaced-apart, raised reinforcing ribs extending along the base.

In accordance with another embodiment of the invention, the feed dishes include respective raised feed stops extending laterally along the length of the base and across each feed dish to retain the grain in the feed dish and prevent the grain from flowing onto a surrounding ground surface.

In accordance with another embodiment of the invention, the side wall panel, lid panel and the end caps include a veneer cover comprising a wood bark surface configuration.

In accordance with another embodiment of the invention, the veneer covers of the side wall panel, lid panel and the end caps are detachable.

In accordance with another embodiment of the invention, the angle of declination of the feed dishes is 25 degrees.

In accordance with another embodiment of the invention, the angle of declination of the feed dishes is between 15 and 35 degrees.

In accordance with another embodiment of the invention, the plurality of feed dishes extend along the length of the base in opposite directions providing animal feeding locations on opposing sides of the feed trough.

In accordance with another embodiment of the invention, the hand holds positioned on the end cap covers are formed by notches in an upper extent of the end cap covers aligned with notches in a lower extent of the lid end cap covers.

In accordance with another embodiment of the invention, the lid panel covering overlaps the first and second curved side wall panels to retard moisture entry into the interior of the feeder.

In accordance with another embodiment of the invention, the ribs include respective notches for receiving a lower edge of the side wall panels.

In accordance with another embodiment of the invention, the animal feed trough is adapted to be stacked in a compact array of components prior to assembly for shipping.

In accordance with another embodiment of the invention, the opening in the top of the body extends along the length of the body.

In accordance with another embodiment of the invention, the body is circular in vertical cross-section and the opening in the top of the body defines an arc of 50 degrees.

BRIEF DESCRIPTION OF THE DRAWING FIGURES

The present invention is best understood when the following detailed description of the invention is read with reference to the accompanying drawings, in which.

DETAILED DESCRIPTION OF THE PREFERRED EMBODIMENT AND BEST MODE

Referring now to the drawings, one preferred embodiment of the animal feed trough ("feed trough" or "trough") is shown at broad reference numeral 10, and includes a base 12 and body 14 including curved body covers 14A, 14B positioned on the base 12. The base 12 has a generally triangular configuration. The body covers 14A, 14B are enclosed on opposite ends by annular body end covers 16, 18 and a top opening 20 is enclosed by a lid cover 22 having lid end covers 24, 26. The body end covers 16, 18 include notches 16A, 18A that align with notches 24A, 26A in the lid end covers 24, 26. In accordance with one preferred embodiment of the invention the opening 20 extends the length of the body 14 and defines an arc of 50 degrees relative to the circular cross-sectional shape of the body 14.

The body covers 14A, 14B and lid cover 22 in accordance with one embodiment are natural bark. The feed trough 10 therefore presents a natural outward appearance of a fallen log—something a forest animal such as a deer would be familiar with and would likely find non-threatening.

Figure 1:
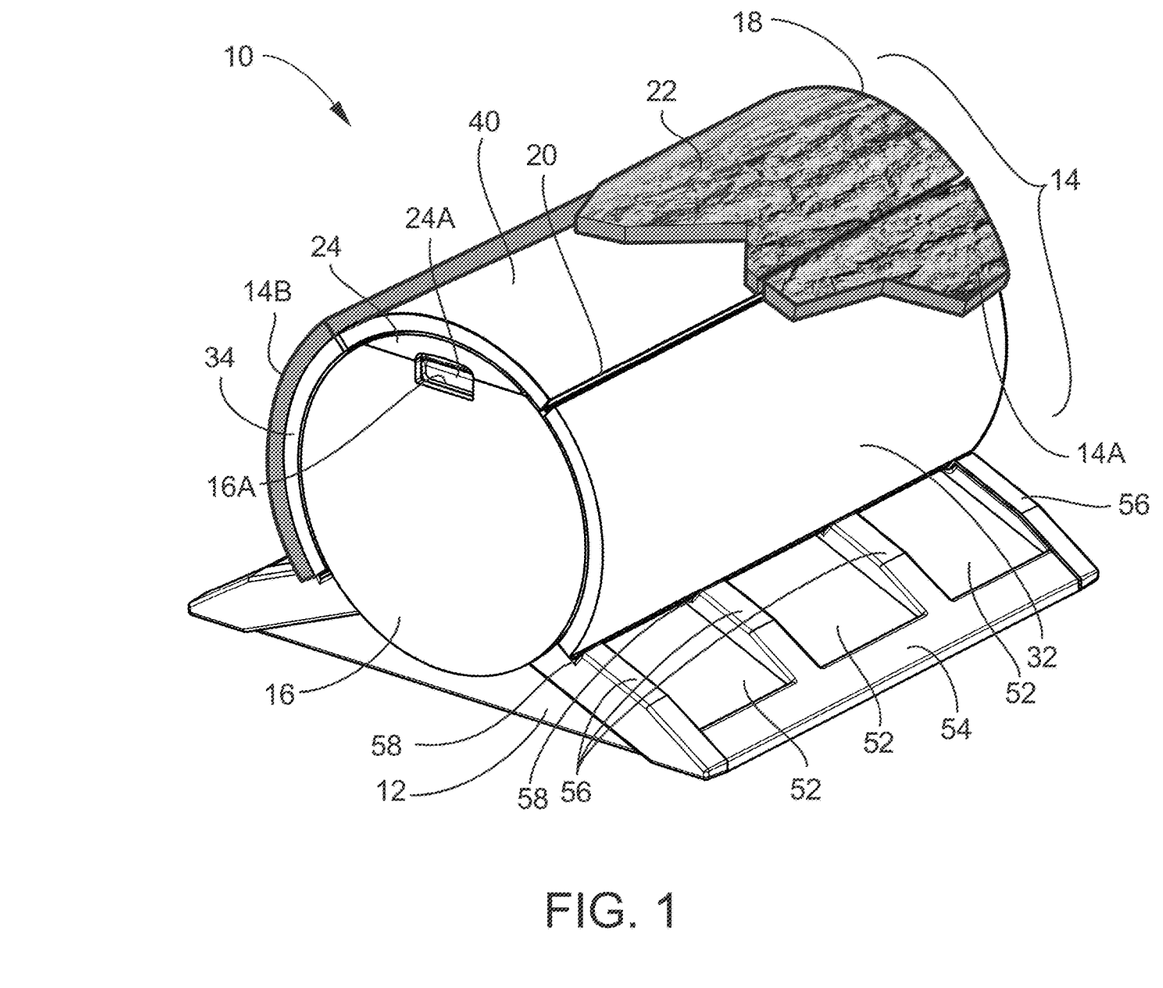
FIG. 1 is a perspective view of an animal feed trough according to a preferred embodiment of the invention with outer covering parts partially broken away for clarity.
Figure 2:
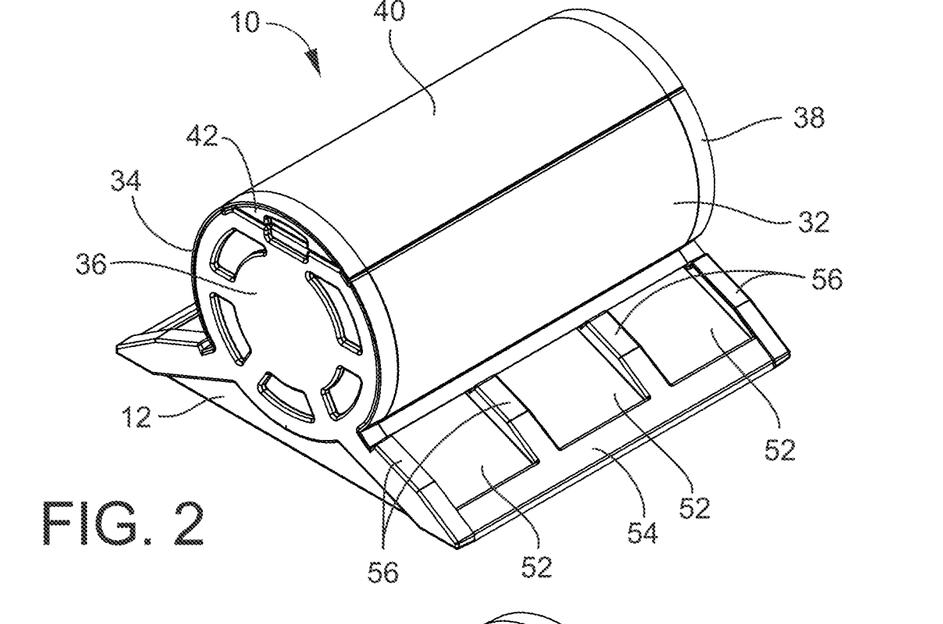
FIG. 2 is a perspective view of the animal feed trough of FIG. 1 with the outer covering parts removed.
Figure 3:
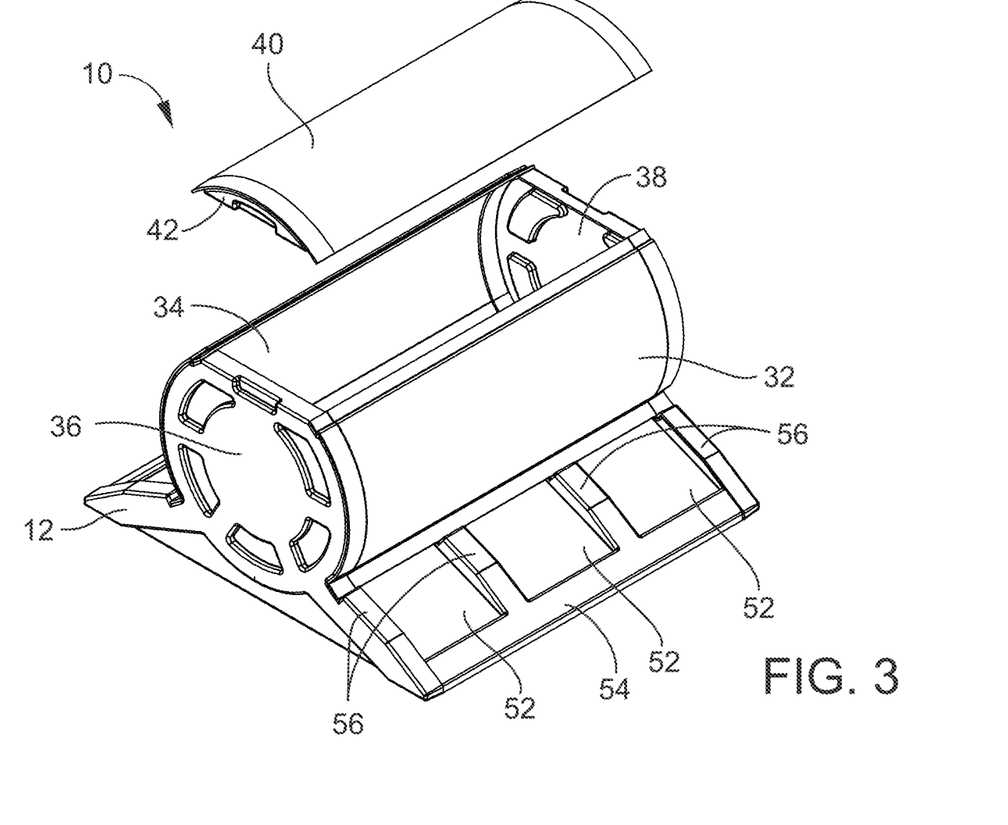
FIG. 3 is a perspective view of the animal feed trough of FIG. 1 with the outer cover removed and the cover exploded away from the body of the trough for clarity.
Figure 5:
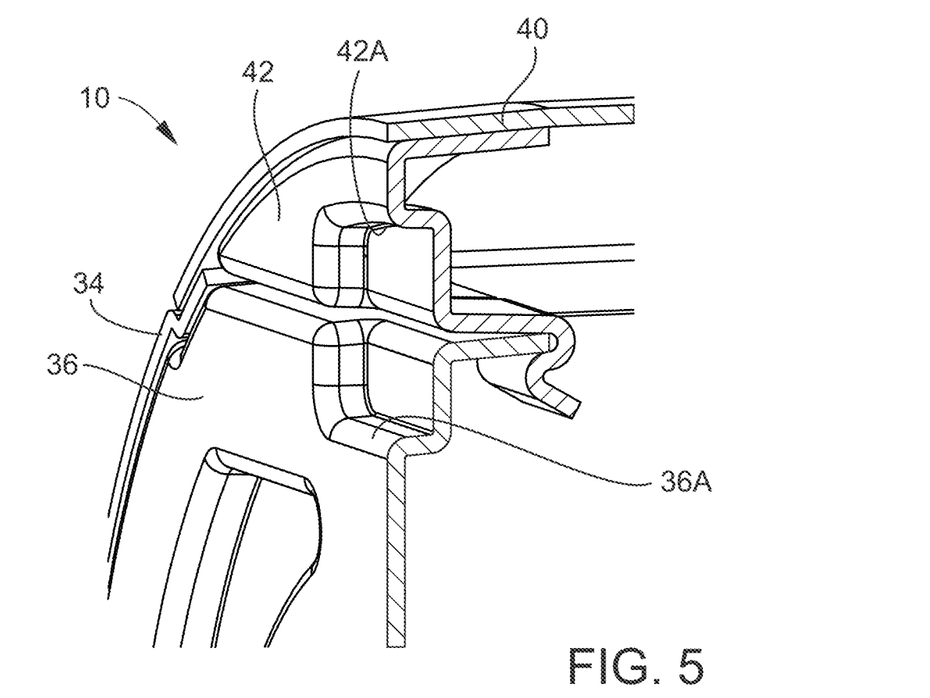
FIG. 5 is an enlarged, fragmentary close-up showing construction details of the body and endcap arrangement that maintains lid alignment.
Figure 7:
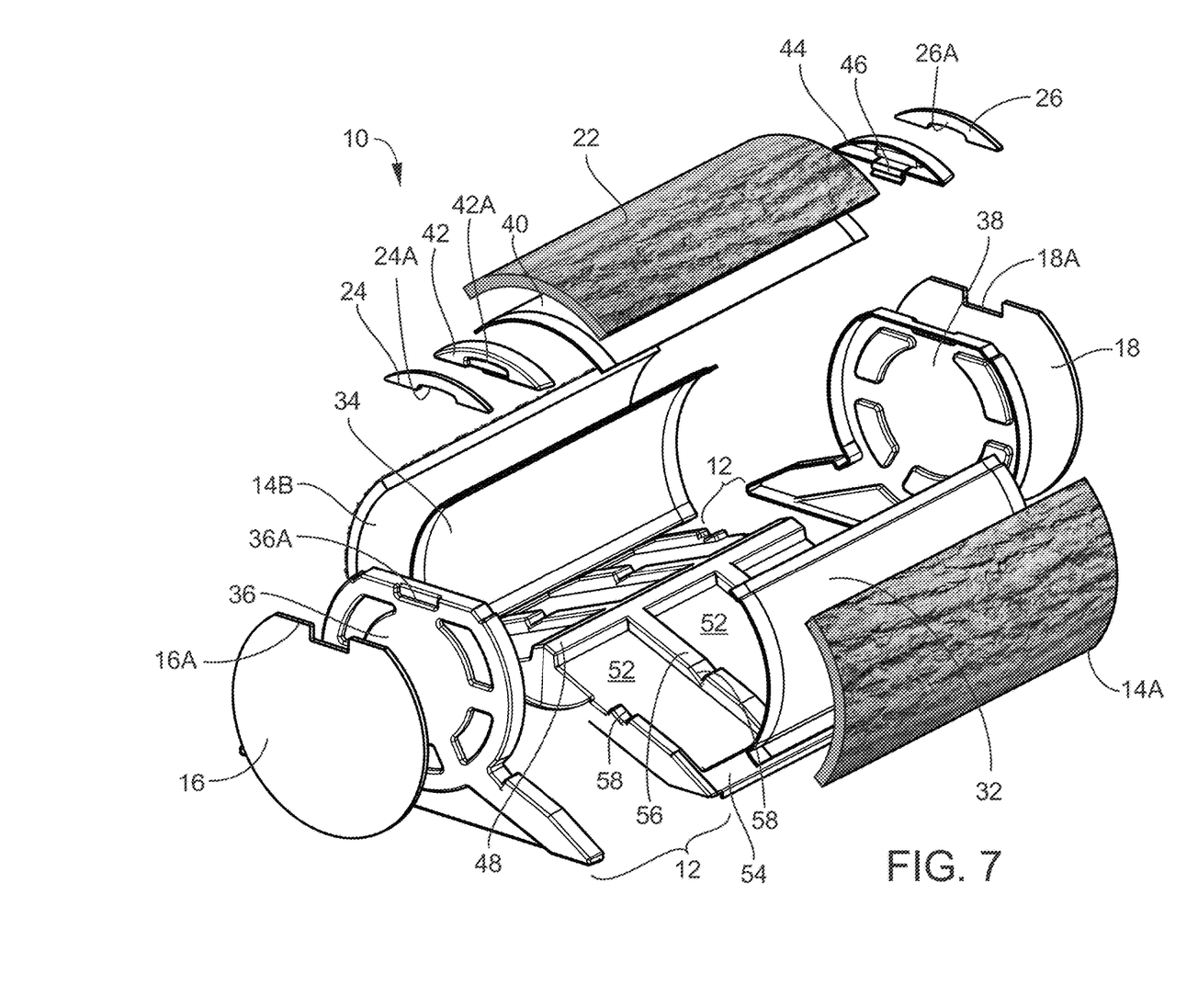
FIG. 7 is an overall exploded perspective view of the animal feed trough.

Referring now to FIGS. 2 and 3, the principal structural elements of the feed trough 10 are illustrated and explained. The body covers 14A, 14B are mounted on a pair of side panels 32, 34 that are bolted or riveted to the base 12, as shown. End caps 36 and 38 are likewise preferably bolted or riveted to the side panels 32, 34 to form the interior capacity of the trough 10. The lid cover 22 is mounted onto and supported by a lid panel 40. Lid end caps 42, 44 are positioned in the ends of and support the end caps 36, 38. The lid end caps 42, 44 include notches 42A, 44A that align with notches 36A, 38A in the lid end covers 36, 38. The aligned notches 16A, 18A and notches 24A, 26A in the lid end covers 24, 26, and the aligned notches 42A, 44A and notches 36A, 38A in the lid end caps 36, 38 also align with each other, as shown in FIGS. 5 and 7, and provide hand holds for the user so that the trough 10 can be manually carried as necessary. As an option, the notches 42A, 44A can be opened through to the interior of the trough 10, in which case they will provide a more secure hand hold and provide air exchange between air in the trough 10 and the surrounding ambient air.

While a wide variety of materials are suitable, according to one preferred embodiment of the animal feed trough 10, the base 12 and body end caps 36, 38 are UV-protected thermoformed ABS plastic. The side panels 32, 34, lid panel 40 and lid end caps 42, 44 are also thermoformed ABS plastic. The body end covers 16, 18 are exterior grade plywood. As noted above, covers 14A, 14B and 22 are preferably natural bark. Preferably, the bark is subjected to a kilning process that stabilizes the bark and sets the bark in the correct curvature to match the curvature of the side panels 32, 34 and lid panel 40. The bark covers 14A, 14B and 22 are preferably not permanently mounted to the side panels 32, 34 and lid panel 40, and can be removed if desired and replaced with different bark or with some other surface treatment. The bark covers 14A, 14B and 22 may be attached by a weak adhesive, or mechanically attached by clips, latches, pins or other similar attachment devices. Artificial covers 14A, 14B and 22 may be formed to resemble bark, and may be thermoformed ABS plastic.

Figure 4:
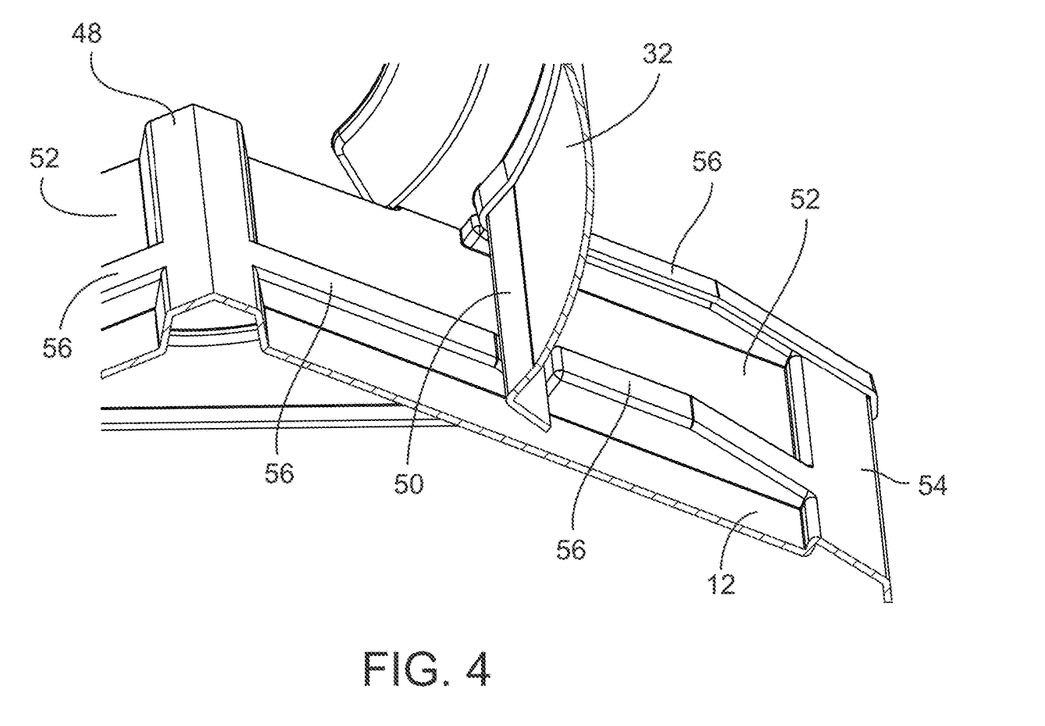
FIG. 4 is an enlarged, fragmentary close-up of the base and feed stop portion of the feed dish.

As best shown in FIGS. 1, 2, 3, 7 and 9, the base 12 has a generally triangular shape that promotes gravitation flow of the grain. The side panels 32, 34 are mounted above a raised central ridge 48 that extends along the length of the base 12 and form feed slots 50 through which gravity-fed grain flows from the interior of the body 14. The base 12 has a series of downstream feed dishes 52 that capture and accumulate the grain that falls by gravity through the feed slots 50. As best shown in FIG. 4, molded in feed stops 54 will retard most of the grain from continuing down the feed dishes 52 onto the surrounding ground. The feed dishes 52 are wide and flat and therefore minimize choking or jamming of the grain as it feeds out of the trough 10, as is the case with many other gravity feeders that attempt to transport grain from a large bin through narrow tubes. The feed dishes 52 extend laterally along the length of the trough 10, promoting even flow of grain along the length of the trough 10 and permitting several animals to feed at the same time. Placement of the feed dishes 52 on both sides of the trough 10 further promotes even flow of grain along the length of the trough 10 and permits several animals to feed at the same time on opposite sides of the feeder 10. The feed dishes 52 are defined by raised ribs 56 which extend downwardly from the central ridge 48. As best shown in FIG. 7, the ribs 56 include notches 58 into which the side wall panels 32 and 34 are positioned. While the angle of declination of the feed dishes 52 may vary, in one preferred embodiment the angle of declination of the feed dishes 52 is 25 degrees, but may optionally be between 15 and 35 degrees.

Figure 6:
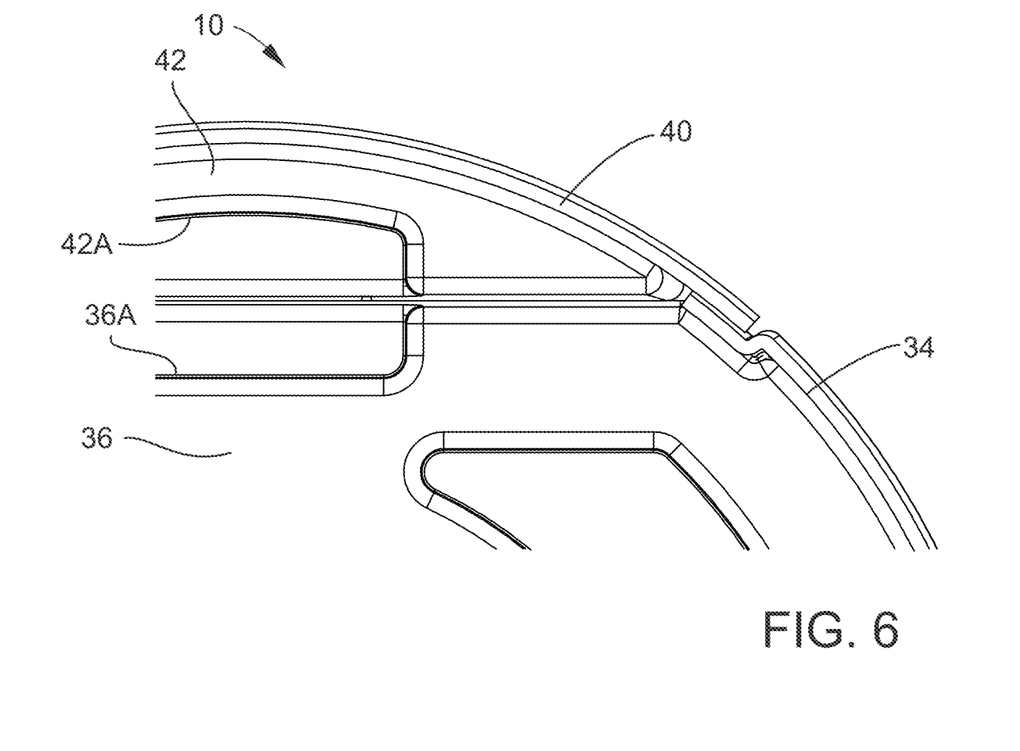
FIG. 6 is a fragmentary close-up of the body and lid overlap.

As is shown in FIG. 6, body end caps 36, 38 (36 shown) and lid panel 40 overlap in order to provide resistance to entry of moisture from the surrounding environment into the interior of the trough 10.

The lid panel 40 can be releasably attached to the pair of side panels 32, 34 by latches of numerous types, by a snap-fit latch or slide fit configuration between the lid panel 40 and the pair of side panels 32, 34. By way of example, FIG. 8 shows a snap-fit latch 46 mounted on lid end cap 44 that snaps over the top edge of the end cap 38 with a comparable structure on lid end cap 42.

Figure 8:
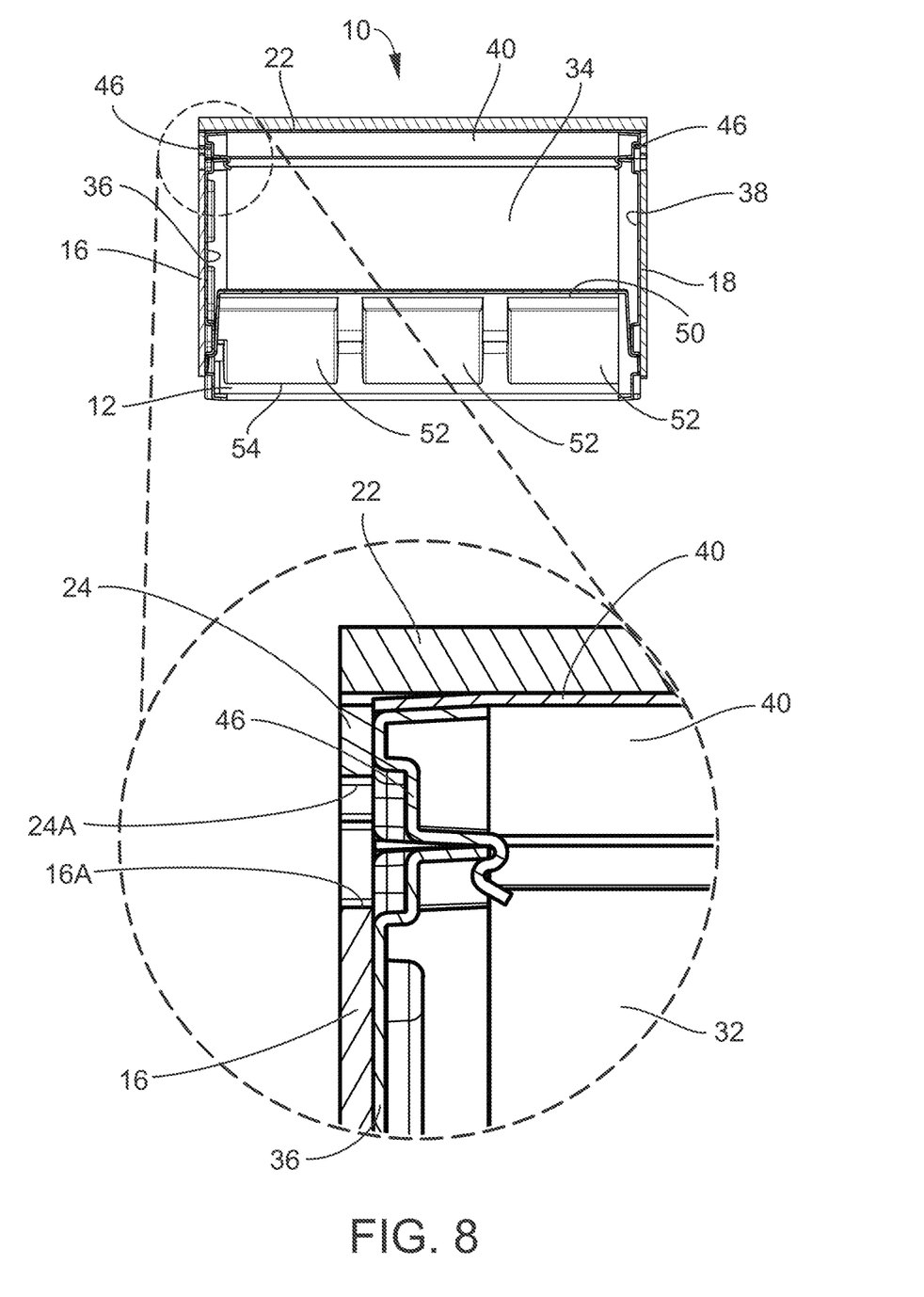
FIG. 8 is a side elevation cross-section and an enlarged detail of a snap-fit detail of the lid attachment.
Figure 9:
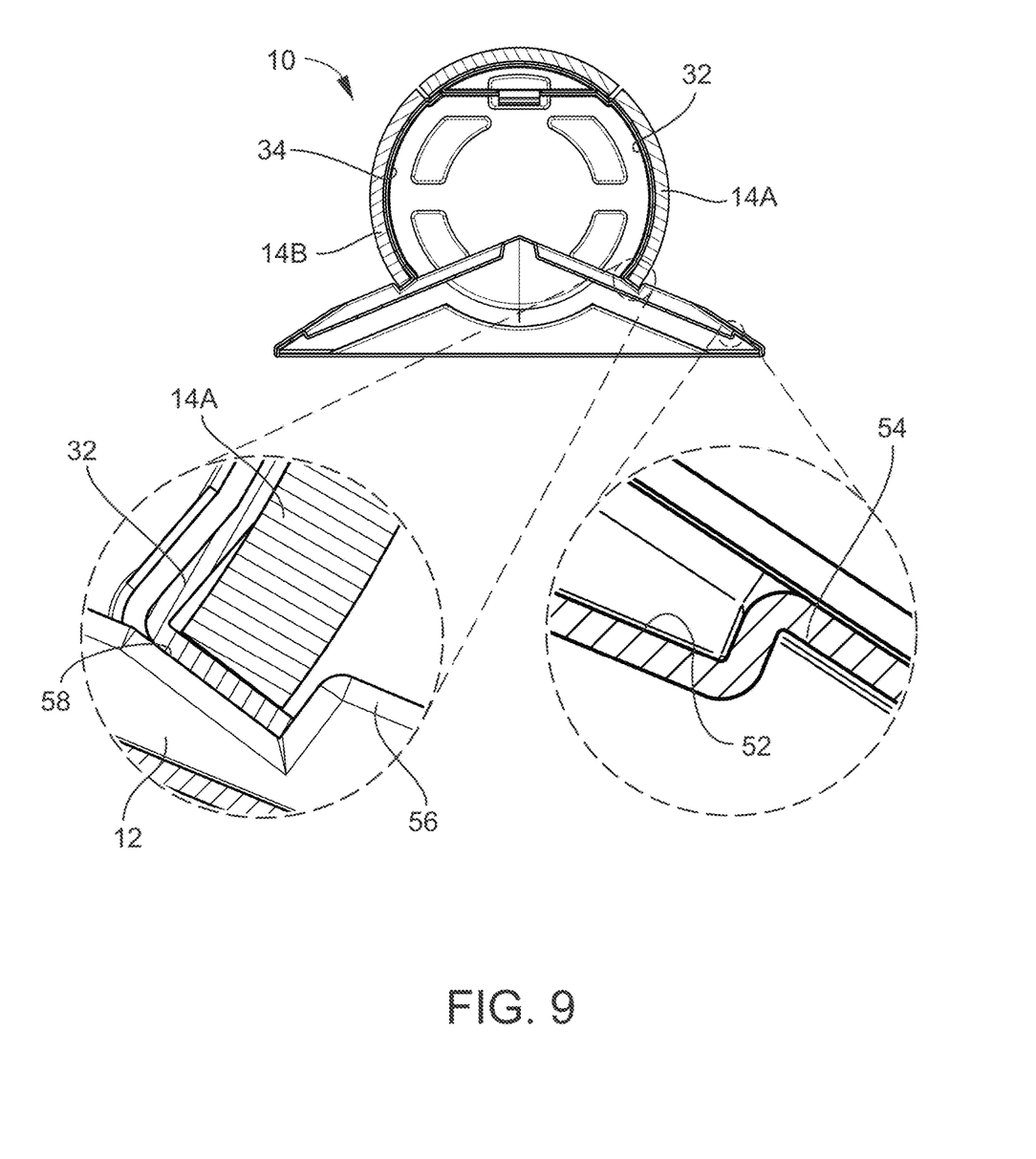
FIG. 9 is a side elevation cross-section and enlarged details showing retention of the side wall panel and body cover in the base, and formation of the feed stop portion of the feed dish.
Figure 10:
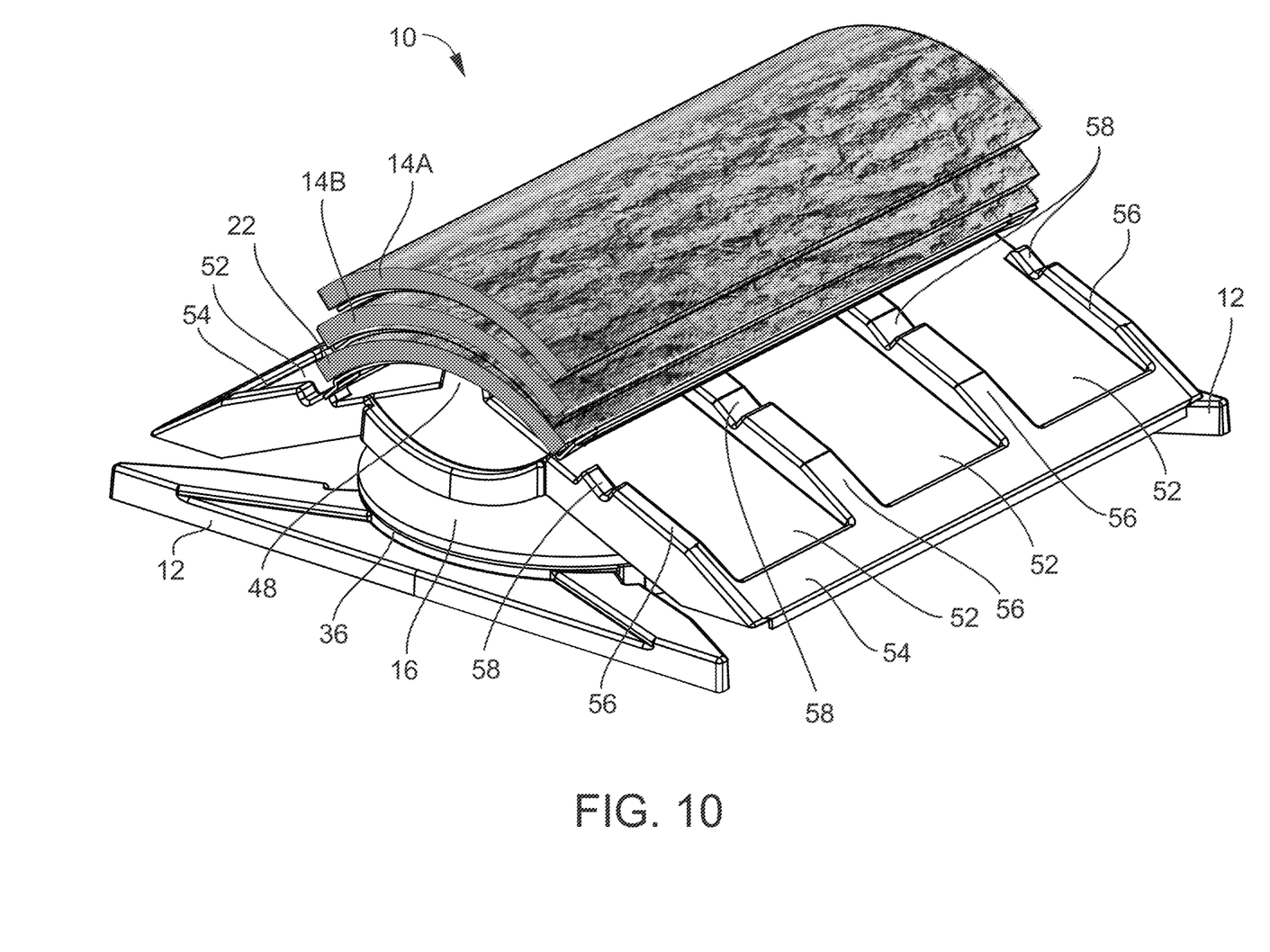
FIG. 10 is an overall perspective view of the animal feed trough prior to assembly and in a configuration suitable for storage, packaging and shipment.

FIG. 8 shows the components of the trough 10 in a nested position prior to assembly and suitable for shipment and storage. By nesting the components in the manner shown, the space that would otherwise exist in the assembled trough 10 is reduced by approximately 50 percent.

While size and capacity can substantially vary, in one preferred embodiment the feeder 10 has a length of 36 in. (91.4 cm); a height of 22.25 in. (56.5 cm); a width of 36 in. (91.4 cm), with a body 12 diameter of 22 in. (55.9 cm). Grain capacity may be approximately 250 lbs. (113 kg.) depending on the type of grain, moisture content and similar factors.

An animal feed trough according to the invention has been described with reference to specific embodiments and examples. Various details of the invention maybe changed without departing from the scope of the invention. Furthermore, the foregoing description of the preferred embodiments of the invention and best mode for practicing the invention are provided for the purpose of illustration only and not for the purpose of limitation, the invention being defined by the claims.

We claim:

1. An animal feed trough, comprising:
   (a) a base having a triangular configuration defined by a central ridge extending along a length of the base, tapering downwardly and outwardly from the central ridge to define a plurality of feed dishes extending along the length of the base;
   (b) a body having a length and a width defined by first and second curved side wall panels and opposing, spaced-apart cylindrical end caps defining an interior for storing a supply of grain, the body adapted for being mounted on and supported by the base and having an open bottom including feed slots for gravity flow of grain from the body onto the base and into the plurality of feed dishes;
   (c) an opening in a topmost portion of the body for introducing grain into the interior of the body;
   (d) a lid panel covering and closing the opening in the body;
   (e) first and second curved body covers attached to and covering the first and second curved side wall panels;
   (f) a lid cover attached to and covering the lid panel; and
   (g) end cap covers positioned on and covering the opposing, spaced-apart cylindrical end caps, wherein hand holds are positioned in the end cap covers and are formed by notches in an upper extent of the end cap covers aligned with notches in a lower extent of the lid end cap covers.

2. An animal feed trough according to claim 1, wherein the lid panel overlaps the curved body covers to prevent entry of moisture into the interior of the body.

3. An animal feed trough according to claim 1, wherein the feed dishes are defined by spaced-apart, raised reinforcing ribs extending along the base.

4. An animal feed trough according to claim 1, wherein the feed dishes include a raised feed stop extending laterally along the length of the base and across each feed dish to retain the grain in the feed dish and prevent the grain from flowing onto a surrounding ground surface.

5. An animal feed trough according to claim 1, wherein the side wall panel, lid panel and the end caps include a veneer cover comprising a wood bark surface configuration.

6. An animal feed trough according to claim 5, wherein the veneer covers of the side wall panel, lid panel and the end caps are detachable.

7. An animal feed trough according to claim 1, wherein the angle of declination of the feed dishes is 25 degrees.

8. An animal feed trough according to claim 1, wherein the angle of declination of the feed dishes is between 15 and 35 degrees.

9. An animal feed trough according to claim 1, wherein the plurality of feed dishes extend along the length of the base in opposite directions providing animal feeding locations on opposing sides of the feed trough.

10. An animal feed trough according to claim 1, wherein the lid panel covering overlaps the first and second curved side wall panels to retard moisture entry into the interior of the feeder.

11. An animal feed trough according to claim 3, wherein the ribs include respective notches for receiving a lower edge of the side wall panels.

12. An animal feed trough according to claim 1, wherein the animal feed trough is adapted to be stacked in an array of components prior to assembly for shipping.

13. An animal feed trough according to claim 1, wherein the opening in the top of the body extends along the length of the body.

14. An animal feed trough according to claim 13, wherein the body is circular in vertical cross-section and the opening in the top of the body defines an arc of 50 degrees.

* * * * *